United States Patent
Avgousti et al.

(10) Patent No.: US 6,359,077 B1
(45) Date of Patent: Mar. 19, 2002

(54) PROCESS FOR PRODUCING HIGH MELT FLOW POLYMERS

(75) Inventors: Marios Avgousti, Plainsboro; Alex Kharazi, Somerset, both of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/537,850

(22) Filed: Mar. 29, 2000

(51) Int. Cl.[7] .................................................. C08F 8/00
(52) U.S. Cl. ................ 525/333.8; 525/333.7; 525/333.9; 525/386; 525/387
(58) Field of Search ........................... 525/333.7, 333.8, 525/333.9, 386, 387

(56) References Cited

U.S. PATENT DOCUMENTS

| | | | | |
|---|---|---|---|---|
| 4,451,589 A | * | 5/1984 | Morman et al. | 525/387 |
| 4,761,432 A | * | 8/1988 | Sonnenberg et al. | 521/60 |
| 4,897,452 A | * | 1/1990 | Berrier et al. | 525/333.8 |
| 5,198,506 A | * | 3/1993 | Adams et al. | 525/333.8 |
| 5,594,074 A | * | 1/1997 | Hwo et al. | 525/387 |
| 6,204,348 B1 | * | 3/2001 | Raetzsch et al. | 526/351 |

* cited by examiner

Primary Examiner—Bernard Lipman

(57) ABSTRACT

Disclosed is a process making polyolefin pellet products that contain at least one unreacted free radical generator which, when heated, undergo chemical degradation producing a low viscosity polymer. The process includes contacting the polyolefin pellet with the at least one free radical generator to coat the pellet, and contacting the coated pellets and at least one unreacted free radical generator at an elevated temperature and for a period of time sufficient for the free radical initiator to soak into the interior of the pellets. The process of the invention enables the production of polyolefin pellets having any desired amount of free radical generator and therefore, production of a desired viscosity, and improves the processability of the polyolefin pellet at customer fabrication facilities to thereby provide superior quality final articles.

10 Claims, No Drawings

PROCESS FOR PRODUCING HIGH MELT FLOW POLYMERS

BACKGROUND OF THE INVENTION

1. Field of the Invention

This invention relates to an improved process for the manufacture of pellets of high melt flow polyolefin polymers, which process involves the incorporation of degradation or "cracking" aids (e.g., free radical generators) into pellets of alpha-olefin polymers. Particularly, this invention relates to a novel process for producing pellets of alpha-olefin polymers that include unreacted free radical generators which, when heated, undergo chemical degradation producing a low viscosity polymer that preferably can be processed into films or fiber.

2. Description of Related Art

Almost all of the plastic resin sold in the market today is in the form of pellets. Plastic resins are sold in the form of pellets to improve transportation, handling, safety and end-user material processability characteristics. Reactor granular resin is thus melted and extruded and made to flow through dies before being cut into pellets. The extrusion process also serves as a step for the addition of performance additives for the required stability and material properties. The size, shape and uniformity of the pellets is important and measures of these pellet characteristics are standard quality assurance/quality control (QA/QC) tests to be met during production. The pelletizing step is important from an operational standpoint. Any upset or malfunction of the pelletizer can result in process shutdown and halt manufacturing with serious financial consequences, especially for large extrusion lines. Therefore, the pelletizing step becomes an important component of the production line of any polyolefin production facility, and it is not to be taken lightly in cases where the polymer renders difficult cut.

Many fiber and film applications of polypropylene resins require that the polymer has high melt flow properties, usually 100 MFI and higher. In particular, the production of non-woven fabrics by melt blown fiber processes calls for polypropylene grades in the range of 500–2000 MFI. The current practice follows two paths. The first one is the coating of granular resin and the second is the production of pellets having unreacted peroxide via a process of partial peroxide degradation. Both processes have the disadvantage that the processor has to perform further chemical modification during the production of the final article leading to process complications, product quality control problems and higher cost.

Other disadvantages are that the peroxide-doped granular or pelleted resin systems often are not homogeneous blends of the polymer with peroxide resulting in a polymer product having non-uniform final melt flow property. Also, if the peroxide/polymer system is in masterbatch form, as is often the case, there may be problems with bleed out during storage and transportation to the customer. The granular system also has the additional disadvantage that the processor has to process granules and not pellets leading to bulk density variations of the feedstock, bridging of granules in feed hoppers, poor conveying, feeding and melting, excessive amounts of fines, and overall safety and housekeeping difficulties as compared to pelleted form. Similarly, the peroxide-laden pellets, besides problems with inhomogeneities in melt flow and peroxide concentrations, suffer from the limitation that their melt flow cannot exceed the level above which pellets can be produced by means known in the art, usually 100 MFI.

This limitation can lead to a too narrow molecular weight distribution of the final article produced using the processor's equipment because the melt flow control over and above the 100 level is governed only by peroxide degradation (which causes narrowing of the molecular weight distribution). If, for example, the optimum polymer system calls for a reactor grade (starting) melt flow of 450 as is usually preferred, there is no means known in the art to produce a polymer pellet system of 450 MFI with unreacted residual peroxide.

An ultra high melt flow grade crystalline polymer typically has a melt flow (MF) of about 50 dg/min or greater. The MF of an ultra high melt flow crystalline polymer can be as high as 15,000 or greater. Ultra high melt flow polymers in the range of about 1000–2000 are particularly useful for the production of non-woven fabrics by melt blown fiber processes. The most common way of making ultra high melt flow polymers having such high melt flows is to resort to chemical reaction modification of reactor grade resins. In this case, reactor granular resin is admixed with a radical generating agent which is thermally activated. Provided a certain temperature and residence time standard is achieved, usually above the melting temperature of polypropylene, the polypropylene molecular chains undergo scission resulting in lower weight average molecular weight polymer. Owing to the random nature of the cleaving process, the molecular weight distribution becomes less narrow. Under the right conditions, the final product is amenable for spinning and meltblowing process applications. This would have been impossible to achieve using unreacted reactor resin alone.

In order to employ such ultra high melt flow polymers in commercial processing equipment, it is desirable to utilize the ultra high melt flow polymer as a pellet feed stock due to the inherent problems associated with granular feed stock. Pelletization of polymers using conventional pelletization systems is a well known method of providing a pellet feedstock. Polypropylene homopolymer and copolymer high melt flow resins have been notoriously difficult to pelletize. Due to low melt strength associated with high melt flow polypropylene resins, reliable and robust underwater pelletizing operations can handle up to 100 MF, perhaps a little higher for lower rate pelleting lines. Due to the low melt strength of such ultra high melt flow crystalline polymers, attempts to pelletize ultra high melt flow polypropylenes with conventional pelletization systems, including underwater pelletization systems, result in an excess amount of non-uniform pellets, malformed pellets, pellet trash and high levels of "fines". Deformation of the polymer pellet is caused by water currents created by rotating knives of the underwater pelletization system. Malformed and non-uniform pellets are undesirable since they tend to bridge in pellet feed hoppers and convey poorly (e.g., plug conveying filters). Further, significant amounts of malformed pellets alter the bulk density of the pellet stock may result in feeding problems in the extrusion line and voids in the final product. In addition to malformed pellets, "trashouts" occur frequently during the production of ultra high melt flow crystalline polymers. Trashouts are extruder shutdowns resulting from polymer buildup on the rotating knives. Such trashouts not only necessitate the consumption of enormous labor and time but induce deterioration of the quality of polyolefin polymer pellets being produced.

Therefore, there is a need to produce pellets of any desired melt flow and molecular weight distribution without any limitations on the reactor grade melt flow that produced them. It has long been desired to find a continuous process for making pellets of ultra high melt flow crystalline polymers to produce uniform, dust-free crystalline polymer pellets having narrow molecular weight distribution. In particular, it is desired to find a high speed continuous process for making pellets of crystalline polymers, such as isotactic polypropylenes, that have a melt flow greater than 100 dg/min.

U.S. Pat. No. 5,198,506 assigned to Phillips Petroleum Company, describes a composition of matter consisting of 80–90 weight percent homogeneous free-flowing polypropylene fluff having a particle size of 100–500 microns and 10–20 percent liquid organic peroxide mixed in at high intensity and temperature below the decomposition temperature of said peroxide allowing the composition to set for 1 to 240 hours to form homogeneous, free-flowing composition of mater. There are a number of difficulties associated with the use of free-flowing fluff instead of resin pellets. First, this document pertains to making mastermix or masterbatch compositions that are to be letdown during a later stage using polypropylene resin. For example, if the desired peroxide level is 1000 ppm and the mastermix used contains 10 weight percent peroxide, the letdown ratio should be 1 part mastermix to 100 part of resin. This large ratio results in non-homogeneous final mixture and relies on subsequent processing at the customer's facilities to ensure improved mixing.

Second, fluff contains particles of various sizes and usually is characterized by a particle size distribution. This distribution has adverse effects on the homogeneity of the composition of matter. Smaller particles will incorporate much higher relative weight percentages as compared to the larger particles because the surface to volume (or mass) ratio of smaller particles is much higher than larger particles. This leads to particle to particle peroxide concentration inconsistencies which are magnified during transportation due to particle size segregation effects.

Third, the high weight percent of peroxide in the polypropylene fluff and long preparation times are undesirable. Polypropylene solubility may very well be below 10 weight percent and thus the added organic peroxide will not be within the particles but on the surface, even on the walls of the packaging medium. In addition, the incorporation time of 1 to 240 hours is very long and can limit rates and bottleneck the process. Finally, the use of granular resin, even in free-flowing form has many disadvantages over pelleted form as described above including limiting rates for the end-use processor.

U.S. Pat. No. 4,451,589 assigned to Kimberly Clark ("the '589 patent") describes a degradation process during which greater than about 50% of the added peroxide remains in the pellets for further degradation after pelletizing. The peroxide can be added prior to or during the extrusion process. U.S. Pat. No. 5,594,074 assigned to Shell Oil Company ("the '074 patent") discloses a similar process, but requires multiple additions of peroxide during the extrusion process thereby leading to improved control of the consistency of the degree of degradation and thus avoiding the production of large percentage of unrecoverable products which do not meet the blending and/or shipping specifications. Although the '074 patent has advantages over the '589 patent, it still suffers from lack of control on the final degree of degradation and the amount of unreacted residual peroxide. In addition, complicated and expensive peroxide addition control schemes have to be devised which are only applicable to specific systems. If, for example, one needs to change the level of peroxide or the resin used, or the additive package, or even process conditions such as rates, temperatures etc., the peroxide scheme has to be revised and optimized for that specific case. One additional drawback of the addition of peroxide during the extrusion step is that it limits the choice of peroxide used—the peroxide decomposition temperature needs to be higher than the melting point of the polymer to avoid premature and complete crosslinking of the peroxide in the extruder.

U.S. Pat. No. 4,897,452 assigned to BP Chemicals proposes a degradation process comprising the use of two free radical generators, the half life of one being 20 times longer than the other at the pelletizing temperature conditions. The slow reacting free radical generator will remain unreacted in the pellets. However, this process has a disadvantage in that it requires extremely high temperatures and/or residence times during conversion of the pellets into finished articles by the converters or end users in order to completely decompose the resident free radical generator.

The disclosures of the aforementioned United States patents are incorporated by reference herein in their entirety.

SUMMARY OF THE INVENTION

There exists a need to develop a method of incorporating free radical generators into peroxide pellets that does not suffer from the disadvantages noted above. Specifically, there exists a need to develop a method of incorporating peroxide into polymer pellets to provide a uniform distribution of peroxide, ease of adaptability depending on the melt flow of the reactor granule, and the desired melt flow, and ease of processing by the end-user.

It is therefore a feature of the present invention to satisfy these needs by providing a process of making polymer pellets having incorporated therein unreacted free radical generators that, when heated, undergo chemical degradation thereby producing a low viscosity polymer that can be processed into films or fiber. In the present invention, many of the aforementioned disadvantages are alleviated by metering in the free radical generator after the pelletization step. It is an additional feature of the present invention to fabricate a polyolefin pellet having any desired melt flow, and hence, the pellets can be specifically tailored to meet the specific consumer demands. The present invention therefore relates to a process of making high melt flow polyolefin pellets and to the pellet products produced thereby. The invention is capable of making these high melt flow polyolefin pellets without suffering from trashouts, slow line speed, and other disadvantages noted above.

In accordance with these and other features of the present invention, there is provided a method of incorporating a melt flow enhancing amount of at least one unreacted free radical generator into a polyolefin pellet by contacting a polyolefin pellet with the at least one free radical generator to coat the pellet, and then contacting the coated pellets and the at least one unreacted free radical generator at an elevated temperature and for a period of time sufficient for the free radical initiator to soak into the interior of the pellets.

In accordance with another feature of the invention, there is provided a method of making polyolefin pellets that having incorporated therein a melt flow enhancing amount of at least one free radical generator which, when heated, undergo thermal degradation to produce polyolefin products having a melt flow above about 50 dg/min. The method includes polymerizing at least one olefin to produce polyolefin granules, melt mixing the polyolefin granules to form a polymer melt, cooling the polymer melt to form a cooled polymer melt, and pelletizing the cooled polymer melt to form polyolefin pellets. The pellets then are heated to a temperature lower than the meting point of the polyolefin and lower than the self acceleration reaction temperature of the at least one unreacted free radical generator, and then contacted with the at least one unreacted free radical generator to coat the pellets. The method finally includes contacting the coated pellets with additional unreacted free radical generator at an elevated temperature and for a period of time sufficient for the free radical generator to soak into the interior of the pellets.

In accordance with an additional feature of the present invention, there is provided a polyolefin pellet having incorporated therein a melt flow enhancing amount of at least one unreacted free radical generator, wherein the pellets have substantially no degraded free radical generator present therein.

The pellets of the present invention can be fabricated to have any desired melt flow by using the appropriate amount of free radical generator. The pellets also are contacted in such a manner that the free radical generator is uniformly dispersed throughout the pellet thereby enabling easier processing by the consumer.

DETAILED DESCRIPTION OF THE INVENTION

Throughout this description, the expression "melt flow enhancing amount" denotes an amount of free radical generator which when added to the polyolefin and subsequently degraded, will increase the melt flow of the polyolefin by at least 1 dg/min (as determined by ASTM D-1238). Those skilled in the art are capable of determining the appropriate amount of free radical generator depending on the ultimate melt flow desired by the consumer, the type of polyolefin and the type of free radical generator. Preferably, the amount of free radical generator added to the polyolefin pellet ranges anywhere from about 0.01 to about 50 wt %, based on the total weight of the polyolefin, more preferably, from about 0.05 to about 20 wt %, and most preferably from about 0.1 to about 10 wt %.

Throughout this description, the expression "elevated temperature" denotes a temperature above room temperature. Throughout this description, the expression "for a period of time sufficient for the free radical generator to soak into the interior of the pellets" denotes the amount of time required for the free radical generator to diffuse into the interior of the pellets. Those skilled in the art recognize that the time required will depend not only on the temperature, but on the particular type of polyolefin and free radical generator used as well.

This time can be readily determined by a rudimentary laboratory experiment that varies the temperature and loading amounts of free radical generator for various polyolefins over time, and then plotting the amount of free radical generator incorporated into the pellet over time. The present inventors have found that for polypropylene, and for normal sized pellets of about ⅛ inch diameter and length at 40° C., it takes about one hour to incorporate about 800 ppm or 6 hours to incorporate 2000 ppm of the free radical generator. The inventors also found that increasing the temperature will expedite the process by about a factor of 2 for every 10–15 degrees C increase. Skilled artisans are capable of determining a period of time sufficient for the free radical generator to soak into the interior of the pellets for various temperatures, polyolefins, and free radical generators, using the guidelines provided herein.

The process of the present invention is particularly useful in making pellets of crystalline thermoplastic polymers having a melt flow, after further heating and degradation of the free radical initiator, of at least 50 dg/min, and preferably at least 100 dg/min (as determined using ASTM D1238, Condition L). It is preferred that the crystalline polymer pellets have a melt flow of at least about 150 dg/min. Crystalline polymers having a melt flow of at least about 200 dg/min are more preferred, with polymers having a melt flow of greater than about 300 dg/min being most preferred.

The present invention relates to polyolefin pellets containing at least one unreacted free radical generator, wherein the pellets have substantially no degraded free radical generator present therein. The expression "substantially no degraded free radical generator" preferably denotes an amount of degraded free radical generator less than about 1 wt %, based on the total weight of the polyolefin pellet, more preferably less than about 0.5 wt %, even more preferably less than about 0.01 wt %, and most preferably no degraded free radical generator.

Fabricating polyolefin pellets is well known in the art. Typically, a polyolefin is prepared either in the gas phase or liquid phase, and the granular polyolefin removed from the reactor. This granular polyolefin then is subjected to melt extrusion, melt kneading, or other melting steps whereby the polyolefin is heated at a temperature above its melting point. Skilled artisans are capable of melting granular polyolefins using techniques well known in the art. The melted polyolefin then usually is extruded through a die, cooled, and cut into pellets. Again, those skilled in the art are well aware of the various mechanisms available to melt, extrude, and pelletize polyolefins.

The crystalline high melt flow polymer to be pelletized in accordance with the invention can be any crystalline polymer which is a polyolefin, preferably: (i) a polyolefin homopolymer having from 2–18 carbon atoms in the repeat unit; (ii) a polyolefin copolymer having at least one comonomer that has repeat units having from 2–18 carbon atoms; or (iii) blends of such polymers. Exemplary of suitable crystalline polymers are polypropylene, polybutylene, polyethylene, ethylene-propylene copolymers, and propylene-butene-1 copolymers, and blends thereof.

A typical method of forming pellets of the polyolefin now will be described in more detail. The polymer, preferably a crystalline polymer, can be fed into a melting mixing mechanism, such as an extruder, mixer, or a heated mixing container, that melts the crystalline polymer to provide a uniform molten polymer material. Any melting mixing mechanism can be used in the invention which is capable of melting and mixing the polyolefin, together with any additives and/or free radical generators, that may be added during mixing, or upstream from the melting mixing mechanism. The melting mixing mechanism preferably is an extruder, albeit a twin screw, co- or counter-rotating, reciprocating melt kneader, self wiping, or tangential extruder.

During the above extrusion process, various additives such as stabilizers, performance enhancers, acid scavengers, extrusion and processing aids, etc. can be added and compounded. Any additive can be added to the polymer during the extrusion process, and skilled artisans are capable of adding suitable additives to polyolefin polymers during extrusion. It is preferred in the present invention that the if a polypropylene polymer is used as the polyolefin, the polypropylene polymer is a homopolymer, an ethylene random copolymer, or a rubber modified impact copolymer containing a propylene homopolymer phase, and an ethylene-propylene rubber copolymer phase.

The molten crystalline polymer material exiting the extruder barrel can be transferred under a positive pressure from about 30 psi to about 360 psi, supplied from any transferring means such as a positive displacement gear pump, a melt pump, or the like, and at a temperature in the range from about 360° F. to about 600° F. A temperature from about 380° F. to about 520° F. is preferred, with a temperature from about 400° F. to about 500° F. being more preferred.

The molten polyolefin then can be passed through a die to form a plurality of molten polymer strands in one or more horizontal arrays. The expression "one or more horizontal arrays" denotes the configuration of molten strands that exits the die. The strands typically are extruded through the die in a series of substantially horizontal, substantially equally spaced apart parallel rows of molten polymer strands. There is no requirement that the molten polymer strands be parallel, although a parallel configuration typically is easier process downstream. In addition, there is no requirement that the strands be exactly horizontal or exactly equally spaced apart, although again, a horizontal and equally spaced apart arrangement typically is easier to process downstream.

The number of strands emerging from the die at the end of the extrusion train is dependent on the polymer melt rate, and on the configuration of the die. Each strand can have a diameter between 1–10 mm, preferably 2–5 mm and most preferably 2.5–3.5 mm with minimal extrudate swell. The rate per strand can be anywhere from about 5–120 lb/hr, preferably 30–80 and most preferably 40–60 lbs/hr.

The molten polymer strands exiting the die then are passed through a cooling mechanism which can consist of any number of possible configurations including, but not limited to, a water bath, a water trough declined with respect to the direction of the horizontal arrays, water jet sprays, and the like. The cooled strands then are subsequently directed into a cutting mechanism, such as any conventional pelletizer, either wet or dry, preferably dry, and cut into pellets. Cut pellets can then be de-watered in a downstream dryer, collected and packaged.

The production of uniformly compounded, dust-free polymer pellets is contemplated within the scope of the invention. The additive or combination of additives, whose provision to the polymer is desired to produce a uniformly compounded product, can be added with the crystalline polymer material to the melting/mixing mechanism, such as an extruder. Additives that are suitable for the pelletization process include additives which are conventionally employed to improve or modify the processability and properties of the polymer. Exemplary of the additives that are useful in the practice of the invention include, but are not limited to, antioxidants, processing stabilizers, acid acceptors, nucleating agents, metal deactivating agents, thermal stabilizers, light or ultraviolet stabilizers, antiblock agents, antistatic agents, lubricants and slip agents which are capable of enhancing the properties and processability of the polymer and the like. Other additives which are useful within the scope of this invention include fillers, pigments and flame retardants.

The flexibility of making a wide range of uniform, semi-spherical pellets is another advantage of the present invention. Pellet sizes range from about 0.5 mm to about 20 mm in diameter. It is preferred that the pellet size range from about 1 mm to about 13 mm, with a pellet size range from about 4 mm to about 10 mm being more preferred.

The process of the present invention successfully produces dust-free polymer pellets. In accordance with the present invention, fine levels less than 0.12 wt %, based on total weight of collected crystalline polymer pellets, can be obtained. Fine levels less than 0.09 wt % are preferably obtained, with fine levels less than 0.05 wt % being more preferred. The resulting uniformly compounded, dust-free, semi-spherical pellets have the advantage of smooth pellet handling, uniform bulk density, and uniform additive dispersion.

Upon forming the pellets of the polymer, the invention contemplates further processing of the pellets to contain the desired amount of un-degraded free radical generator. There are a variety of methods of incorporating free radical generators into the polymer pellets including spraying with a liquid containing the free radical generator, soaking the pellets in a bath containing the free radical generator, heating the pellets and coating them with a liquid containing the free radical generator, and the like. It is preferred in the present invention to contact the pellets with a melt flow enhancing amount of at least one unreacted free radical generator to coat the pellet, and then contacting the coated pellets and the at least one unreacted free radical generator at an elevated temperature and for a period of time sufficient for the free radical initiator to soak into the interior of the pellets.

The initial contact, or coating procedure, can take place at ambient temperatures or at an elevated temperature. If the coating procedure does take place at an elevated temperature, however, care must be taken to avoid premature degradation of the free radical generator. It is preferred to heat the pellets prior to coating because the time required to fully incorporate the free radical generator in the subsequent soaking procedure will be reduced by virtue of the increased solubility and diffusional rates. It is preferred that the pellet be heated to a temperature as high as possible, but lower than the melting point of the polymer, and lower than the self acceleration reaction temperature of the free radical generator. The present inventors have found that a good compromise for most free radical generators and polyolefins is heating to a temperature greater than ambient temperature (e.g., at or about 21–25° C.) to a temperature less than about 90° C., preferably less than about 85° C., and more preferably less than about 80° C. Skilled artisans are capable of determining a suitable temperature for each combination of polyolefin and free radical generator, using the guidelines provided herein.

During this initial contacting procedure, the polyolefin pellet is essentially coated with a solution containing the free radical generator. Coating can be effected by any mechanism know in the art. It is preferred to pass the pellets past a series of spray jets that serve to coat the surface of the pellet. Alternatively, the pellets can be briefly submerged in a solution containing the free radical generator. Other methods of coating the polyolefin pellet also can be used so long as the pellet is coated sufficiently with the free radical generator. A particularly preferred method of coating the pellets is described immediately below.

The pellets can be taken out of the dryer from the end of the pelleting line and directed to a mixing device. The pellets can be preheated prior to the mixing device, if desired. The pellet temperature must be low enough to prevent any premature reaction when the polyolefin pellet is contacted with the free radical generator. The pellets can be heated using conventional means known to in the art, for example a fluid bed heater. Coating the pellet with the free radical generator can be performed in batch or continuous fashion.

If batch, a prescribed amount of pellets is placed in a heated vessel along with the free radical generator. The heated vessel usually has moving inserts that can impart mechanical agitation and dispersion of the free radical generator on the pellet surface. An example can be a Henshel mixer. If continuous, the pellets preferably are passed near the vicinity of a spray nozzle and mixed immediately after delivery of the free radical generator on their surface. This set up can be an auger type setup with continuous movement of pellets near the free radical generator injection port aided by mechanical means, or a motionless blending system where the pellets are directed down a maze of vein-like plate inserts aided by gravity.

Upon coating the polyolefin pellets, the invention contemplates conveying the coated pellets to a soaking procedure whereby the pellets will be contacted with a free radical generator at an elevated temperature and for a period of time sufficient for the free radical initiator to soak into the interior of the pellets. The same free radical generator can be used in the soaking procedure as that used to coat the polyolefin pellet, or a different free radial generator can be used. Preferably, the same free radical generator is used. As mentioned earlier, the time required for the free radical generator to be fully soaked in the pellet can be determined by simulation and laboratory studies. The present inventors have found that for normal sized pellets of about ⅛ inch diameter and length at 40° C., it would take about 1 hour to fully incorporate 800 ppm or 6 hours for 2000 ppm or the free radical generator. Increasing the temperature expedites the process by about a factor of 2 for every 10–15° C. increase.

It is preferred to conduct the soaking procedure at a temperature within the range of from about 25 to about 85° C., more preferably within the range of from about 35 to about 65° C., and most preferably within the range of from about 40 to about 60° C. It also is preferred that the polyolefin pellet be soaked for a period of time within the range of from about 0.5 to about 30 hours, preferably from about 1 to about 15 hours, and more preferably from about 1 to about 10 hours. Skilled artisans will appreciate, however, that if the desired melt flow of the polyolefin is high, on the order of 1000 dg/min. or more, the temperature may exceed the ranges noted above, and/or the time required for the soaking procedure also may exceed the ranges noted above.

Any free radical generator capable of increasing the melt flow, and consequently, decreasing the melt viscosity of the polyolefin can be used in the present invention. Preferably, the free radical generator is a peroxide. More preferably, the peroxide is selected from the group consisting of t-butylperoxy-maleic acid, OO-t-butyl O-isopropyl monoperoxycarbonate, OO-t-butyl O-(2-ethoxyl) monoperoxycarbonate, 2,5-dimethyl 2,5-di(benzoyl-peroxy) hexane, OO-t-amyl O-(2-ethylhexyl) mono peroxy carbonate, t-butylperoxy acetate, t-amyl peroxy acetate, t-butylperoxy benzoate, t-amyl peroxy benzoate, di-t-butyl diperoxyphthalate, dicumyl peroxide, 2,5-dimethyl-2,5-di(t-butylperoxy) hexane, 2,5-dimethyl-2,5-di(t-amylperoxy) hexane, t-butyl cumyl peroxide, α-α-bis(t-butylperoxy) diisopropylbenzene, di-t-butyl peroxide, 2,5-dimethyl-2,5-di (t-butylperoxy) hexyne-3, n-butyl-4,4-bis (t-butylperoxy) valerate, 1,1-di(t-butylperoxy) 3,3,5-trimethyl cyclohexane, 1,1-di (t-butylperoxy) cyclohexane, 1,1-di-(t-amylperoxy) cyclohexane, 2,2-di (t-butyl-peroxy)butane, ethyl-3,3,-di (t-butylperoxy)butyrate, 2,2-di (t-amyl peroxy) propane, ethyl 3,3-di(t-amylperoxy) butyrate, di-t-amylperoxide, and mixtures thereof A particularly preferred free radical generator is 2,5-dimethyl-2,5-di(t-butylperoxy) hexane, as well as mixtures thereof with 2,5-dimethyl-2,5-di(t-amylperoxy) hexane.

In accordance with another feature of the invention, there is provided a method of making polyolefin pellets that have incorporated therein a melt flow enhancing amount of at least one free radical generator which, when heated, undergo thermal degradation to produce polyolefin products having a melt flow above about 50 dg/min. In the method, polyolefin granules are first subjected to melt mixing, and then formed into pellets. The polyolefin pellets then are heated to a temperature lower than the meting point of the polyolefin and lower than the self acceleration reaction temperature of the at least one free radical generator, and then contacted with the at least one free radical generator to coat the pellets. The coated pellets then are contacted with additional free radical generator at an elevated temperature and for a period of time sufficient for the free radical generator to soak into the interior of the pellets.

The invention also contemplates a polyolefin pellet having incorporated therein a melt flow enhancing amount of at least one unreacted free radical generator, wherein the pellets have substantially no degraded free radical generator present therein. These polyolefin pellets typically will have a melt flow within the range of from about 20 to 5,000 dg/min, as measured by ASTM D-1238, Condition L, and preferably from about 100 to about 3,000 dg/min.

An advantage of the present invention is that it produces polymer systems which, when thermally degraded at the customer's extrusion equipment, can be processed at any desired melt flow. This invention also presents substantial manufacturing advantages by eliminating the need for pelletization of high melt flow polymers, eliminating or reducing free radical generator decomposition byproduct formation and storage, and their concomitant hazards specifically associated with certain free radical generators, and eliminating or reducing interaction with certain additives during pelletizing,. The invention also makes available a new product family having a wide variety of melt flow indices and molecular weight distributions which would otherwise have been impossible to produce in pellet form.

Additionally, the invention improves the processability of the polymer pellet at customer fabrication facilities to thereby provide superior quality final articles. This is achieved by the fact that the processor is supplied with a uniform polymer and free radical generator mixture in pellet form which can be fed, melted, reacted and metered more consistently. The processor enjoys more consistently cracked product with minimal melt flow fluctuations compared with current practice of either metering in at the extruder feed throat or liquid injecting the free radical generator in the extruder, or soaking granular resin which results in peroxide level inhomogeneities.

While the present invention has been described in connection with preferred embodiments and particularly preferred examples, it will be understood that it is not intended to limit the invention to those embodiments. On the contrary, it is intended to cover all alternatives, modifications, and equivalents as may be included within the spirit and scope of the invention as defined by the appended claims. The present invention is also applicable to the processing of waste polymer material to permit reuse in various applications. It will be apparent to one skilled in the art that optimum operating conditions and concentrations will vary depending upon the properties of the polymer being used and the ultimate properties desired by the end users of the pellets. All documents cited above are incorporated by reference herein in their entirety.

EXAMPLES

The following examples delineate various aspects of the present invention. They are shown for descriptive purposes only and the invention is not limited to these specific examples.

Example 1

Polypropylene homopolymer pellets having an initial melt flow of about 120 dg/min (as determined by ASTM D-1238, Condition L) were impregnated with various amounts of 2,5 Dimethyl-2,5-di(tert-butylperoxy)hexane liquid organic peroxide to produce compositions of matter. 150 lbs of pellets were heated to 70° C. using a fluid bed heater. Then, the heated pellets were transported to a heat-jacketed 200 liter Henschel mixer which also was charged with 700 parts per million 2,5 Dimethyl-2,5-di(tert-butylperoxy)hexane organic liquid peroxide. An impeller with standard internal mixing blades was rotated at 200 rpm corresponding to a linear tip speed of about 5.5 m/sec. This speed was considered low to medium intensity range and served to evenly coat the pellets with the available amount of peroxide without creating fines or increasing the polymer temperature.

The blending time in the Henschel was 30 seconds. The pellets were then allowed a 2-minute residence time for soaking and drying purposes. After discharging, the pellets were placed in a drum and kept in a 55° C. oven for about 2 hours. At the end of this process, the peroxide was uniformly distributed in the pellets so that the concentration profile in any cross-section of the pellet was constant.

Example 2

Polypropylene homopolymer pellets with a starting melt flow of about 120 were pressed in 5 inch square plaques of two thicknesses, one at 40 mils and the other at 75 mils. The plaques were prepared by slow cooling as well as fast cooling in the press to eliminate any effects the crystallization process may have on the results. It was found that the results were independent of the plaque preparation method. Two pairs of the 40 and 75 mils plaques were placed and suspended in four closed glass containers filled with 2,5 Dimethyl-2,5-di(tert-butylperoxy)hexane organic liquid peroxide. The weight of the plaques were determined prior to contact with the organic peroxide. The two different size plaques placed in individual glass containers then were placed in a constant temperature 40° C. oven and the remaining second pair was placed in a 60° C. oven. At various time intervals, all the plaques were removed from the peroxide-filled container, vacuum-dried and weighed. The increase in weight is equal to the peroxide uptake and the absorbed peroxide weight percent is determined as shown in the table below:

TABLE 1

| Peroxide Contact Time (Hrs) | Oven Temp. (Degrees C.) | Plaque Size (mils) | Peroxide Absorption (weight percent) |
| --- | --- | --- | --- |
| 19 | 40 | 40 | 0.41 |
| 42 | 40 | 40 | 0.62 |
| 63 | 40 | 40 | 0.76 |
| 159 | 40 | 40 | 1.32 |
| 19 | 40 | 75 | 0.16 |
| 42 | 40 | 75 | 0.24 |
| 63 | 40 | 75 | 0.30 |
| 159 | 40 | 75 | 0.51 |
| 19 | 60 | 40 | 5.5 |
| 42 | 60 | 40 | 7.2 |
| 63 | 60 | 40 | 7.7 |
| 159 | 60 | 40 | 8.0 |
| 19 | 60 | 75 | 3.1 |
| 42 | 60 | 75 | 4.5 |
| 63 | 60 | 75 | 5.4 |
| 159 | 60 | 75 | 7.3 |

The data above can be used to calculate the rate of peroxide absorption within any polypropylene pellets based on their shape and size. It is clear that temperature is a variable in determining the speed of peroxide incorporation and its concentration uniformity within each pellet.

Using these data, or carrying out examples similar to these with other polymers and other free radical generators, one can individually tailor the polyolefin pellets to meet the respective customer needs. For example, if a customer desires a 1,000 melt flow polypropylene homopolymer, pellets can be manufactured to contain the requisite amount of free radical generator so that when the customer melts the pellets to product the desired end product, the polymer will have a melt flow of about 1,000. Skilled artisans will recognize that a variety of pellets can be manufactured to meet any customer's needs.

We claim:

1. A method of incorporating a melt flow enhancing amount of at least one unreacted free radical generator into a polyolefin pellet comprising:
    contacting the polyolefin pellet with the at least one free radical generator to coat the pellet; and
    contacting the coated pellets and the at least one unreacted free radical generator at an elevated temperature and for a period of time sufficient for the free radical initiator to soak into the interior of the pellets.

2. The method as claimed in claim 1, wherein the melt flow enhancing amount of the at least one unreacted free radical generator is within the range of from about 0.01 to about 50 wt %, based on the total weight of the polyolefin.

3. The method as claimed in claim 1, wherein the coated pellets are contacted with the at least one unreacted free radical generator at a temperature within the range of from about 25 to about 85° C.

4. The method as claimed in claim 1, wherein the coated pellets are contacted with the at least one unreacted free radical generator for a period of time within the range of from about 0.5 to about 30 hours.

5. The method as claimed in claim 1, wherein the unreacted free radical generator is selected from the group consisting of t-butylperoxy-maleic acid, OO-t-butyl O-isopropyl monoperoxycarbonate, OO-t-butyl O-(2-ethoxyl) monoperoxycarbonate, 2,5-dimethyl 2,5-di (benzoyl-peroxy) hexane, OO-t-amyl O-(2-ethylhexyl) mono peroxy carbonate, t-butylperoxy acetate, t-amyl peroxy acetate, t-butylperoxy benzoate, t-amyl peroxy benzoate, di-t-butyl diperoxyphthalate, dicumyl peroxide, 2,5-dimethyl-2,5-di(t-butylperoxy) hexane, 2,5-dimethyl-2,5-di(t-amylperoxy) hexane, t-butyl cumyl peroxide, α-α-bis (t-butylperoxy) diisopropylbenzene, di-t-butyl peroxide, 2,5-dimethyl-2,5-di (t-butylperoxy) hexyne-3, n-butyl-4,4-bis (t-butylperoxy) valerate, 1,1-di(t-butylperoxy) 3,3,5-trimethyl cyclohexane, 1,1-di (t-butylperoxy) cyclohexane, 1,1-di-(t-amylperoxy) cyclohexane, 2,2-di (t-butyl-peroxy) butane, ethyl-3,3,-di (t-butylperoxy)butyrate, 2,2-di (t-amyl peroxy) propane, ethyl 3,3-di(t-amylperoxy) butyrate, di-t-amylperoxide, and mixtures thereof.

6. A method of making polyolefin pellets having incorporated therein a melt flow enhancing amount of at least one unreacted free radical generator comprising:

polymerizing at least one olefin to produce polyolefin granules;

melt mixing the polyolefin granules to form a polymer melt;

cooling the polymer melt to form a cooled polymer melt;

pelletizing the cooled polymer melt to form polyolefin pellets;

heating the polyolefin pellets to a temperature lower than the meting point of the polyolefin and lower than the self acceleration reaction temperature of the at least one unreacted free radical generator;

contacting the heated polyolefin pellets with the at least one unreacted free radical generator to coat the pellets; and contacting the coated pellets with additional unreacted free radical generator at an elevated temperature and for a period of time sufficient for the free radical generator to soak into the interior of the pellets.

7. The method as claimed in claim 5, wherein the procedure of heating the polyolefin pellets to a temperature lower than the meting point of the polyolefin and lower than the self acceleration reaction temperature of the at least one unreacted free radical generator is conducted at a temperature within the range of from about ambient temperature to a temperature less than about 90° C.

8. The method as claimed in claim 6, wherein the unreacted free radical generator is selected from the group consisting of t-butylperoxy-maleic acid, OO-t-butyl O-isopropyl monoperoxycarbonate, OO-t-butyl O-(2-ethoxyl) monoperoxycarbonate, 2,5-dimethyl 2,5-di (benzoyl-peroxy) hexane, OO-t-amyl O-(2-ethylhexyl) mono peroxy carbonate, t-butylperoxy acetate, t-amyl peroxy acetate, t-butylperoxy benzoate, t-amyl peroxy benzoate, di-t-butyl diperoxyphthalate, dicumyl peroxide, 2,5-dimethyl-2,5-di(t-butylperoxy) hexane, 2,5-dimethyl-2,5-di(t-amylperoxy) hexane, t-butyl cumyl peroxide, $\alpha$-$\alpha$-bis (t-butylperoxy) diisopropylbenzene, di-t-butyl peroxide, 2,5-dimethyl-2,5-di (t-butylperoxy) hexyne-3, n-butyl-4,4-bis (t-butylperoxy) valerate, 1,1-di(t-butylperoxy) 3,3,5-trimethyl cyclohexane, 1,1-di (t-butylperoxy) cyclohexane, 1,1-di-(t-amylperoxy) cyclohexane, 2,2-di (t-butyl-peroxy) butane, ethyl-3,3,-di (t-butylperoxy)butyrate, 2,2-di (t-amyl peroxy) propane, ethyl 3,3-di(t-amylperoxy) butyrate, di-t-amylperoxide, and mixtures thereof.

9. A polyolefin pellet containing a melt flow enhancing amount of at least one unreacted free radical generator made in accordance with the method of claim 1, wherein the polyolefin pellet contains substantially no degraded free radical generator.

10. The polyolefin pellet as claimed in claim 9, wherein the at least one free radical generator is present in the pellet in an amount within the range of from about 0.01 to about 50 wt %, based on the total weight of the polyolefin.

* * * * *